United States Patent Office 2,772,988
Patented Dec. 4, 1956

2,772,988

METHOD OF WATERPROOFING LEATHER

Jürgen Plapper and Rudi Heyden, Dusseldorf, Germany, assignors to Böhme Fettchemie G. m. b. H., Dusseldorf, Germany, a corporation of Germany No Drawing. Application March 16, 1956,
Serial No. 571,871

Claims priority, application Germany November 18, 1955

6 Claims. (Cl. 117—135.5)

This invention relates to a new and improved method of rendering leather water-repellent, and more particularly to a method of waterproofing leather with aqueous alcohol solutions of organic metal complex compounds.

It is known that alcohol solutions of complex organic metal compounds are obtained by reacting a solution of an alkaline salt of a polyvalent metal in a lower molecular monovalent alcohol with an acid phosphoric acid ester of a higher molecular hydroxyl compound. The resulting solution can be diluted with water to any desired concentration. For example, it is possible to produce water-miscible alcohol solutions of complex organic aluminum or chromium compounds by reacting a solution of basic aluminum or chromium salts in methanol or ethanol with acid monoesters or diesters of phosphoric acid formed with high-molecular hydroxyl compounds.

More particularly, the metal compound starting component for the above reaction may be a basic salt of a polyvalent metal formed with an inorganic or organic acid, such as basic chromium chloride, basic aluminum nitrate, or basic titanium chloride, for example. The phosphoric acid ester starting component may be a monoester or diester of orthophosphoric acid, such as the mono- or di-octylester of orthophosphoric acid, the mono- or di-dodecylester of orthophosphoric acid, the mono or di-oleylester of orthophosphoric acid, for example, as well as phosphoric acid esters formed with other aliphatic, cycloaliphatic, aliphaticaromatic and cycloaliphatic-aromatic hydroxyl compounds. The phosphoric acid ester starting component may, however, also take the form of an acidic ester mixture, such as is obtained by a reaction of phosphorus pentoxide with higher-molecular hydroxyl compounds.

The solvent medium for the reaction may be any lower-molecular monohyroxy alcohol, especially methanol or ethanol.

The reaction product thus obtained represents a solution of the complex metal compound in a lower-molecular monohydroxy alcohol, which is miscible with water or organic solvents in any desired proportion.

We have found that the above-described organic complex metal compounds, especially those of chromium or aluminum, may advantageously be used to produce water-repellent or water-proofing impregnations in leather. Such impregnations strongly reduce the water-permeability and wettability of the leather without imparting a greasy feel or other undesirable properties, such as stickiness and the like, to the leather. The active ingredient of these solutions, i. e. the complex metal compound, readily penetrates into the leather and gives the leather a dry, slightly rough feel even when the leather is sufficiently impregnated to render it completely water-repellent.

In order to render leather water-repellent and water-proof, the alcohol solution of the organic complex metal compound is diluted with water or an organic solvent to the desired concentration and the leather is then impregnated with this solution by any of the customary methods, namely immersion, fulling, brushing or plush-wheeling, or, in lustering suede, for example, by spraying with a spray gun. Since the complex metal compounds also possess fatting properties, the customary fat-liquoring treatment may be partially or entirely omitted, depending upon the amount of complex metal compound employed.

In general, about 1 to 15% and preferably 3 to 6% of the complex metal compound, based upon the shaved weight of the leather, are required to impart adequate water-repellent properties to the leather by immersion or plush-wheeling. If the leather is to be impregnated by brushing or spraying, 1 to 10% solutions, preferably 1 to 3% solutions, of the complex metal compound should be employed. While aqueous solutions of the metal complex are preferred, solutions in organic solvents, such as trichloroethylene, isopropylalcohol, benzene or the like, may also be used with equal effectiveness.

It is quite obvious that the complex metal compounds employed as water-proofing agents for leather in accordance with the present invention need not be produced by the reaction described above. Other suitable methods may be used, provided the products obtained are water-soluble or organic-solvent-soluble complex phosphoric acid metal alkyl esters having a cationic character. For example, such compounds are also obtained by reacting alkaline metal salts with acid alkylphosphates in a fused condition.

The water-proofing process herein described may not only be applied to chrome- and combination-tanned, purely aniline-dyed upper leather, to leather for occupational apparel and industrial purposes and to suede leather, but also to bark-tanned leather, such as heavy and light sole leather. The advantageous effects achieved by the present process reside primarily in that relatively large amounts of the water-proofing agent can be used without proportionately increasing the stuffing effect or the greasiness of the leather, which is of particular advantage in water-proofing suede leather. The water-repellent properties of leather treated in the manner herein described are excellent and the other desirable characteristics of the leather remain unimpaired. For example, suede leather impregnated with the aqueous solutions above referred to can be immersed in water for as many as 24 hours without showing any evidence of being "wetted" by the water. The same water-repellent characteristics can be demonstrated by fashioning a bag or pouch with the impregnated suede and filling the container thus formed with water; the inner surface of the bag is not wetted by the water and none of the water seeps through the leather. Similarly, if chrome-tanned upper leather water-proofed in accordance with the present process is brought in contact with water, it will not develop the undesirable water spots which usually form on unfinished chrome-tanned uppers.

The impregnation of bottom leather with the water-proofing agents in accordance with the present invention may be carried out in conjunction with the fixing step, or after drying in conjunction with the dampening step prior to rolling. The water-permeability quotient of such impregnated bottom leather is more than 100% greater than that of normally tanned leather, and its water-absorption capacity less by from ⅓ to ½ of that of untreated leather.

The following examples will further illustrate the present invention and enable others skilled in the art to understand it more completely. The recitation of these examples should, however, not be construed to indicate an intention on our part to limit our invention to the materials and conditions mentioned in the examples.

EXAMPLE I

*Water-proofing of aniline-dyed, chrome-tanned uppers and industrial apparel leather*

Production of the organic complex metal salt.—270 parts by weight of a methanol solution containing 15.2 parts by weight of 66% basic chromium (III) chloride were admixed with a solution of 10 parts by weight phosphoric acid mono-tetradecylester in 70 parts by weight methanol, and the resulting mixture was refluxed for about five hours. At the end of this period the reaction mixture formed thereby is soluble in water and can be obtained very readily in concentrated form by distilling off a portion of the methanol.

Impregnation of the tanned leather.—Chrome-tanned calf and cow hides which had previously been neutralized and dyed were immersed for 2 to 3 hours into an aqueous solution composed of 3 to 6% of the complex chromium salt formed by the procedure above described and 80 to 100% water at 50° C., both percentages calculated on the basis of the dry weight of the hides.

Finishing.—Subsequently, the treated hides were fat-liquored as needed in a separate bath with a commercial fat-liquoring oil, and finished as customary by drying, sawdusting, staking and tacking. The leather thus obtained was water-repellent and its water-impermeability under pressure was increased on the average by more than 100% over normally finished leather.

EXAMPLE II

*Water-proofing of suede leather*

Production of the complex metal salt.—257 parts by weight of a methanolic solution containing 17.5 parts by weight of 33% basic chromium (III) chloride were admixed with a solution composed of 14.75 parts by weight of a technical grade phosphoric acid alkyl ester mixture, wherein the alkyl radicals comprised from 12 to 18 carbon atoms, in 85 parts by weight methanol. The resulting mixture was refluxed for about five hours, and thereafter a portion of the methanol was distilled off. The concentrated solution of the complex chromium salt obtained thereby was miscible with water in any desired proportion.

Impregnation and finishing of suede leather.—Dyed suede leather was then tumbled for about two hours in a drum with a solution composed of 2.5–5% by weight of the complex chromium salt produced by the procedure above described and 80 to 100% by weight water at 50° C., both percentages based upon the dry weight of the suede leather being treated. Thereafter, the impregnated suede was dried, fluffed if necessary and finished in the customary manner. The resulting product was a completely water-repellent suede which was completely free from greasiness.

EXAMPLE III

*Water-proofing of chrome-tanned suede leather*

Chrome-tanned suede leather was dyed and, if necessary, fluffed and thereafter impregnated with a 1 to 3% aqueous solution of the chromium complex salt formed in accordance with the procedure described in Example II. In this case, however, the water-proofing solution was applied to the leather by means of a spray gun under a pressure of 6 atmospheres gauge, using two spray passes at right angles to each other. Upon finishing in the usual manner, a non-wettable suede leather was obtained.

EXAMPLE IV

*Water-proofing of chrome-tanned suede leather*

Production of the complex metal salt.—182 parts by weight of a methanolic solution comprising 11.5 parts by weight of 33% basic aluminum chloride were slowly admixed at the boiling point with 35.5 parts by weight of an acid phosphoric acid ester mixture, obtained by esterifying phosphorus pentoxide with a fatty alcohol mixture comprising alcohols having from 12 to 18 carbon atoms, dissolved in 200 parts by weight methanol. After all of the phosphoric acid ester solution was added, the mixture was refluxed for about 5 hours. The resulting solution was not miscible with water. By distilling off the methanol, a colorless, dry, non-greasy complex aluminum salt was obtained.

Impregnation of suede leather.—Chrome-tanned suede leather which had been dyed and fluffed as needed, was sprayed by means of a spray gun with a 1 to 3% alcoholic solution of the complex aluminum salt produced in accordance with the above procedure, using 2 to 3 spray passes at right angles to each other. A non-wettable suede leather was obtained upon drying and customary finishing. This method of water-proofing was particularly suitable for light-colored and white suede.

EXAMPLE V

*Water-proofing of vegetable-tanned leather*

Vegetable-tanned light and heavy sole leather was first dried and then immersed for 1 to 2 minutes into a solution made up by diluting a 50% solution of the chromium complex salt produced in Example I with water in a ratio from 1:3 to 1:6. Thereafter, the impregnated leather was dried and rolled. The leather was thereby rendered water-repellent and its water-permeability was also strongly reduced while its air-permeability was not diminished.

The same results were obtained when the solution was applied to the leather in place of the dampening water prior to rolling.

While we have given certain specific embodiments of our invention we wish it to be understood that the present invention is not limited to these embodiments, and that various changes and modifications may be made therein without departing from the spirit of the invention or the scope of the appended claims.

We claim:

1. The method of water-proofing leather which comprises impregnating tanned leather with a solution comprising about 1 to 15% by weight, based upon the dry weight of the leather, of an organic metal complex compound produced by reacting a basic salt of a polyvalent metal with an acid phosphoric acid ester of higher-molecular hydroxyl compounds in the presence of a lower-molecular monohydroxy alcohol, and drying the impregnated leather.

2. The method of water-proofing leather which comprises impregnating tanned leather with a solution comprising about 1 to 15% by weight, based upon the dry weight of the leather, of an organic metal complex salt produced by reacting a basic salt of a polyvalent metal selected from the group consisting of chromium and aluminum with an acid phosphoric acid ester of a higher-molecular hydroxyalkyl compound in the presence of a lower-molecular monohydroxy alcohol selected from the group consisting of methanol and ethanol, and drying the impregnated leather.

3. The method of water-proofing leather which comprises impregnating tanned leather with an aqueous solution comprising about 1 to 15% by weight, based upon the dry weight of the leather, of an organic chromium complex salt produced by reacting a basic chromium salt with an acid phosphoric acid ester of a hydroxyalkyl compound having from 12 to 18 carbon atoms in the alkyl chain in the presence of methanol, and drying the impregnated leather.

4. The method of water-proofing leather which comprises impregnating tanned leather with an alcohol solution comprising about 1 to 15% by weight, based upon the dry weight of the leather, of an organic aluminum complex salt produced by reacting a basic salt of aluminum with an acid phosphoric acid ester of a hydroxyalkyl compound having from 12 to 18 carbon atoms in the alkyl chain in the presence of methanol, and drying the impregnated leather.

5. The method of water-proofing leather as in claim 3, wherein said basic chromium salt is basic chromium chloride.

6. The method of water-proofing leather as in claim 4, wherein said basic aluminum salt is basic aluminum chloride.

No references cited.